(12) United States Patent
Båth

(10) Patent No.: US 11,920,900 B2
(45) Date of Patent: Mar. 5, 2024

(54) SYSTEM FOR EJECTION OF COUNTERMEASURE BOXES

(71) Applicant: SAAB AB, Linköping (SE)

(72) Inventor: Jörgen Båth, Spånga (SE)

(73) Assignee: SAAB AB, Linköping (SE)

( * ) Notice: Subject to any disclaimer, the term of this patent is extended or adjusted under 35 U.S.C. 154(b) by 87 days.

(21) Appl. No.: 17/781,199

(22) PCT Filed: Dec. 5, 2019

(86) PCT No.: PCT/SE2019/051235
§ 371 (c)(1),
(2) Date: May 31, 2022

(87) PCT Pub. No.: WO2021/112729
PCT Pub. Date: Jun. 10, 2021

(65) Prior Publication Data
US 2023/0003490 A1    Jan. 5, 2023

(51) Int. Cl.
| F41H 11/02 | (2006.01) |
| B64D 1/02 | (2006.01) |
| F41A 9/64 | (2006.01) |
| F41B 4/00 | (2006.01) |
| F41F 5/00 | (2006.01) |
| F41F 7/00 | (2006.01) |

(52) U.S. Cl.
CPC .............. *F41H 11/02* (2013.01); *B64D 1/02* (2013.01); *F41A 9/64* (2013.01); *F41B 4/00* (2013.01); *F41F 5/00* (2013.01); *F41F 7/00* (2013.01)

(58) Field of Classification Search
CPC ... F41H 11/02; B64D 1/02; F41A 9/64; F41B 4/00; F41F 5/00; F41F 7/00
USPC ........................................................ 89/1.51
See application file for complete search history.

(56) References Cited

U.S. PATENT DOCUMENTS

| 2,859,896 A | * | 11/1958 | Johnson | .................. | F42B 12/70 |
| | | | | | 221/244 |
| 2,954,948 A | * | 10/1960 | Johnson | .................. | F41H 11/02 |
| | | | | | 221/277 |
| 3,027,047 A | * | 3/1962 | Johnson | .................. | B64D 1/16 |
| | | | | | 83/357 |

(Continued)

FOREIGN PATENT DOCUMENTS

| EP | 1637829 A1 | 3/2006 |
| GB | 1104546 A | 2/1968 |
| JP | 10227598 A | 8/1998 |

OTHER PUBLICATIONS

International Search Report and Written Opinion dated Jun. 15, 2020 for International Application No. PCT/SE2019/051235, 12 pages.

*Primary Examiner* — Samir Abdosh
(74) *Attorney, Agent, or Firm* — Sage Patent Group

(57) ABSTRACT

An ejecting system for dispensing countermeasure boxes includes a container arranged to hold a multiple of stacked boxes. A pushing actuator is arranged to push at one end of the stack of boxes in a first direction. The system further includes an ejecting mechanism including a driving actuator connected to a rotating member. The rotating member is arranged to engage with a box and on the side of the box most distant from the pushing actuator such that said box is moved in a second direction perpendicular to said first direction, and ejected.

12 Claims, 2 Drawing Sheets

(56) References Cited

U.S. PATENT DOCUMENTS

| | | | | |
|---|---|---|---|---|
| 3,040,727 | A | * | 6/1962 | Edwards .................. B64D 1/16 |
| | | | | 124/71 |
| 4,650,092 | A | | 3/1987 | Andersson et al. |
| 5,461,960 | A | * | 10/1995 | Marks .................... H01R 31/06 |
| | | | | 89/1.51 |
| 5,663,518 | A | * | 9/1997 | Widmer .................. F41H 11/02 |
| | | | | 83/346 |
| 5,773,745 | A | * | 6/1998 | Widmer .................. F41H 11/02 |
| | | | | 83/346 |
| 6,666,351 | B1 | * | 12/2003 | Hartz ..................... F41H 11/02 |
| | | | | 102/342 |
| 11,685,526 | B2 | * | 6/2023 | Zätterqvist .............. B64D 7/00 |
| | | | | 89/1.59 |
| 11,719,504 | B1 | * | 8/2023 | Kopman ................ F41B 11/54 |
| | | | | 124/78 |
| 2009/0120955 | A1 | | 5/2009 | Friede et al. |
| 2012/0097795 | A1 | | 4/2012 | Zätterqvist |
| 2022/0297836 | A1 | * | 9/2022 | Plemons .................. B64D 1/02 |

* cited by examiner

SYSTEM FOR EJECTION OF COUNTERMEASURE BOXES

CROSS-REFERENCE TO RELATED APPLICATIONS

This application is a 35 U.S.C § 371 national stage application for International Application No. PCT/SE2019/051235, entitled "SYSTEM FOR EJECTION OF COUNTERMEASURE BOXES", filed on Dec. 5, 2019, the disclosures and contents of which are hereby incorporated by reference in their entireties.

TECHNICAL FIELD

The present invention relates to an ejecting system for dispensing countermeasure boxes. The system comprises a container arranged to hold a multiple of stacked boxes, wherein an actuator is arranged to press at one end of the stack of boxes in a first direction. It also relates to a vehicle comprising the above mentioned ejecting system.

BACKGROUND

There are several known systems for ejection of countermeasure boxes. Countermeasure boxes normally comprise chaff or flare. Chaff is a radar countermeasure in which aircraft or other targets spread a cloud of small, thin pieces of aluminum, metallized glass fibre or plastic, which either appears as a cluster of primary targets on radar screens or swamps the screen with multiple returns.

Modern armed forces use chaff to distract radar-guided missiles from their targets. Most military aircrafts and warships have chaff dispensing systems for self-defense. An intercontinental ballistic missile may release in its mid-course phase several independent warheads as well as penetration aids such as decoy balloons and chaff.

A special variety of flares is used in military aircraft as a defensive countermeasure against heat-seeking missiles. These flares are usually discharged individually or in salvos by the pilot or automatically by tail-warning devices, and are accompanied by vigorous evasive maneuvering. Since they are intended to deceive infrared seeking missiles, aka heat-seekers, these flares burn at temperatures of thousands of degrees, incandescing in the visible spectrum as well.

U.S. Pat. No. 2,954,948 discloses a system where boxes are arranged in a vertical stack in an upstanding container. Downward movement of the boxes in the container is obtained by the force of gravity. Just before ejection of one of the boxes the remaining stack of boxes tends to tilt with respect to the container so that there exists a considerable risk that the remaining boxes will jam in the container. The risk of jamming increases when the container is somewhat inclined with regard to the direction of the force of gravity during ejection.

In U.S. Pat. No. 4,650,092 a device for ejection of boxes is disclosed, wherein the risk of jamming of the boxes in the container is avoided in all positions of the container with respect to the direction of the force of gravity. A transport mechanism is provided with a first gear means located adjacent to the exit and engageable with second gear means which is part of each of the boxes.

US 2009/0120955 A1 discloses an alternative dispenser system that is provided with a motor gear of a conventional kind which induces a force for pushing a box from a stack of boxes in a magazine of the dispenser system through an outlet an out to the surrounding air. The pushing is done by utilizing a crankshaft, scotch yoke or another type of mechanism motored by e.g. electricity or pneumatics. However, this system is somewhat bulky.

SUMMARY

It is therefore an object of the present invention to provide a system for ejecting countermeasure boxes that is more compact in design and is faster in ejecting boxes.

According to a first aspect of the present disclosure an ejecting system for dispensing countermeasure boxes comprises a container arranged to hold a multiple of stacked boxes, wherein a pushing actuator is arranged to push at one end of the stack of boxes in a first direction. The system further comprises an ejecting mechanism comprising a driving actuator connected to a rotating member. The rotating member is arranged to engage with a box and on the side of the box most distant from the pushing actuator such that said box is moved in a second direction perpendicular to said first direction, and ejected.

Typically, in prior art, an arm is moving the box in the second direction by pushing the box, i.e. the arm will have to move back to its starting position in order to be ready for pushing the next box in line. Also, the arm and the mechanism to move it is much more bulky than the solution of the present disclosure. Thus, the present solution provides for a more compact system and at the same time being faster in ejecting boxes than with the reciprocating movement mechanism of prior art. One box is ejected at a time since the rotating member can only engage with one box for moving it in said second direction.

The rotating member is a wheel according to a further aspect of the present disclosure. The part of the wheel that comes into contact with the boxes should be a high friction material, such as for instance rubber. A further possibility is to have a coating on the side of the boxes that will be in contact with the wheel that is such that it increases the friction to the wheel. The wheel itself could also have a coating on the contact parts that fits with the coating of the boxes for maximum friction.

According to a further aspect of the present disclosure the rotating member is a wheel having a structure on its periphery wherein at least one side of each of the boxes has a corresponding structure such that the structures on the wheel and the boxes mesh with one another. The boxes are arranged such that the at least one side of each of the boxes with the corresponding structure is the side of the boxes most distant from the pushing actuator.

The ambient temperature of the system could vary depending on where it is used. For decreasing the risk of the rotating member not being able to effectively engage with the boxes, the structure on the periphery of the wheel that come into contact with the boxes could have a structure such that it does not require friction to function.

An example of such a structure is the rotating member having a gear wheel structure and wherein at least one side of each of the boxes comprises a rack structure for meshing with the gear wheel structure. The boxes are arranged such that the at least one side of each of the boxes with the rack structure is the side of the boxes most distant from the pushing actuator.

According to another aspect of the present disclosure the driving actuator is an electric motor. An electric motor generally responds instantaneously when a control signal to start ejecting boxes is received.

According to yet a further aspect of the present disclosure the pushing actuator is a spring. Similar to a magazine with rounds, the container holding the boxes could be equipped with a spring pushing the boxes towards an opening in the container.

According to an alternative aspect of the present disclosure the pushing actuator is pneumatically driven or electromechanically driven.

The ejecting system (1) according to any of the preceding claims, wherein the boxes comprise chaff.

According to a further aspect of the present disclosure, the boxes comprise flare or chaff.

In accordance with one aspect of the present disclosure a vehicle comprises an ejecting system according to the above. For instance, the vehicle is an aircraft.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

Figure 1:
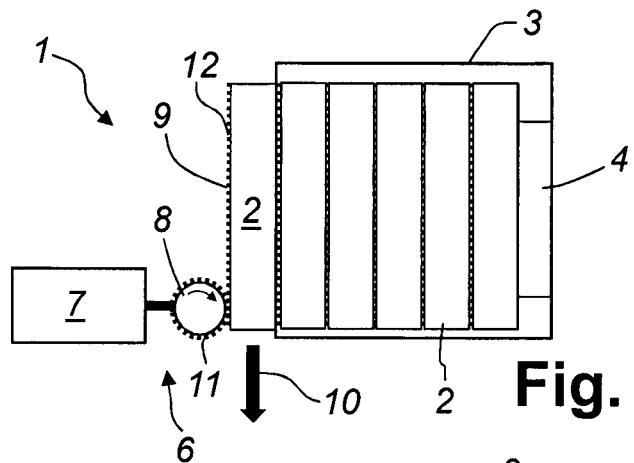
FIGS. 1 to 5 show in sequence the ejecting of a box from a system according to the present disclosure.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With reference to FIGS. 1-5, an ejecting system 1 for dispensing countermeasure boxes 2 comprises a container 3 arranged to hold a multiple of stacked boxes 2. A pushing actuator 4 is arranged to push at one end of the stack of boxes 2 in a first direction 5.

The system 1 further comprises an ejecting mechanism 6 comprising a driving actuator 7 connected to a rotating member 8, wherein the rotating member 8 is arranged to engage with a box 2 and on the side 9 of the box 2 most distant from the pushing actuator 4 such that said box 2 is moved in a second direction 10 perpendicular to said first direction 5, and ejected.

Further, in the shown example, the rotating member 8 is a wheel having a structure 11 on its periphery, wherein at least one side 9 of each of the boxes 2 has a corresponding structure 12 such that the structures on the wheel and the boxes 2 mesh with one another.

More specifically, the rotating member 8 has a gear wheel structure 11 and wherein at least one side 9 of each of the boxes 2 comprises a rack structure 12 for meshing with the gear wheel structure 11 of the rotating member 8.

Figure 2:
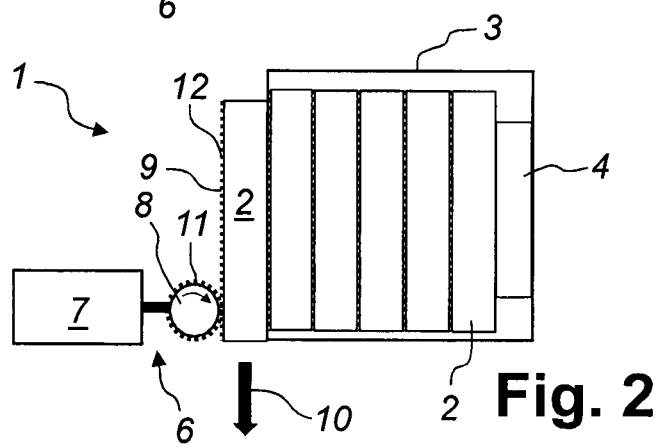
Figure 3:
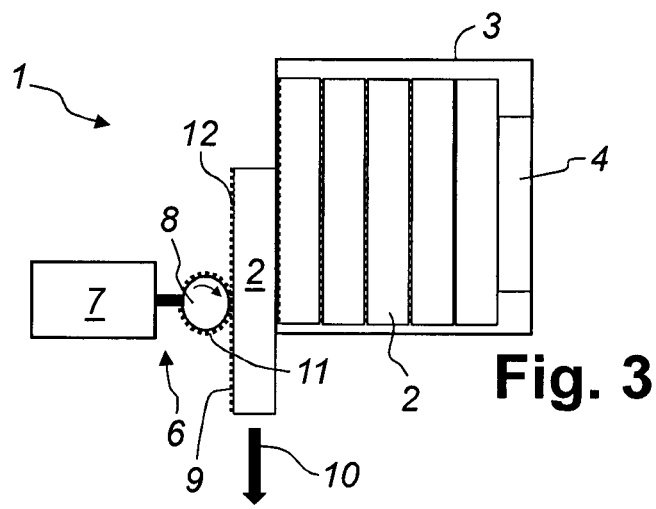
Figure 4:
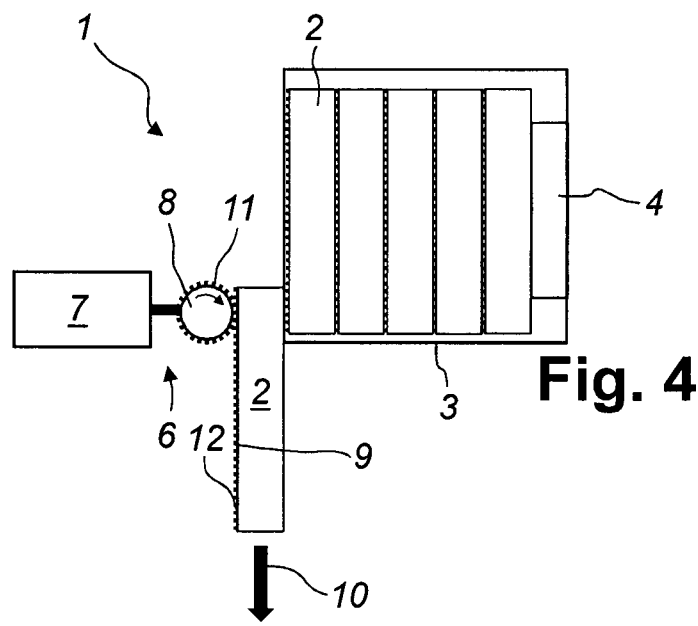

Starting in FIG. 1, a first box 2, just out of the container 3, is engaged with the rotating member 8 which starts to rotate. In FIGS. 2 to 4 the box 2 is moved along in one direction 10 perpendicular to the stack of boxes 2 left in the container 3.

Figure 5:
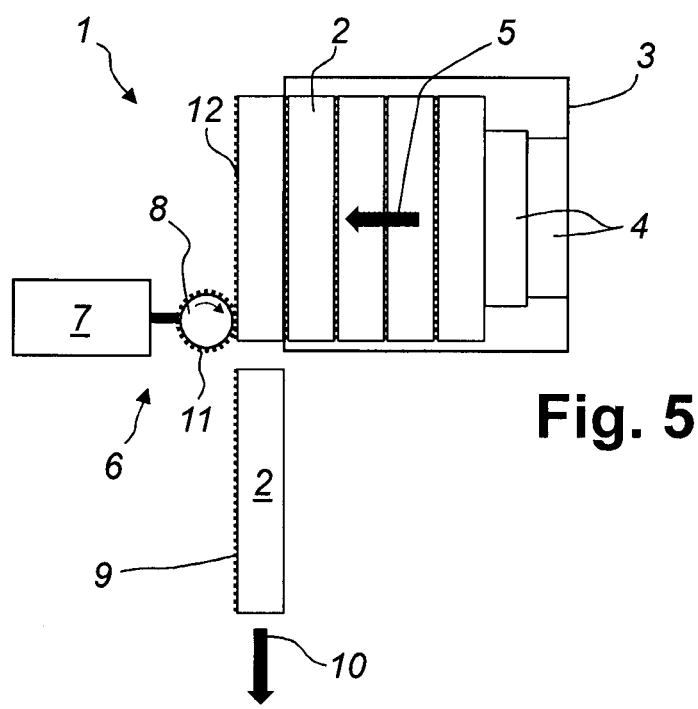

FIG. 5 depicts a box 2 that has just been released from the system 1. The remaining five boxes 2 shown in the figure is pushed by the pushing actuator 4 to a position where the next box 2 in line comes into contact with and engages with the rotating member 8.

The pushing actuator 8 shown displays a telescopic function. By means of the system of the present disclosure the time between two consecutive boxes 2 to be ejected is the time needed to push the next box 2 into position and in engagement with the rotating member 8.

It is to be understood that the present invention is not limited to the embodiments described above and illustrated in the drawings; rather, the skilled person will recognize that many changes and modifications may be made within the scope of the appended claims. For example the rotating member could be a chain or some kind of caterpillar band that engages with a corresponding structure on the boxes.

Further, the rotating member 8 having a structure 11 on its periphery and that at least one side 9 of each of the boxes 2 has a corresponding structure 12 such that the structures on the rotating member 8 and the boxes 2 mesh with one another means that it is also possible that the corresponding structure 12 on the boxes 2 are available on other further sides of the boxes. For instance, the boxes 2 could have the corresponding structure on two sides and thus facilitating the charging of the container 3 with boxes 2. With a square section of the boxes the corresponding structure could then of course be on four sides.

The invention claimed is:

1. An ejecting system for dispensing countermeasure boxes, comprising a container arranged to hold a multiple of stacked boxes, wherein a pushing actuator is arranged to push at one end of the stack of boxes in a first direction, wherein that the system further comprises an ejecting mechanism comprising a driving actuator connected to a rotating member, the rotating member being arranged to engage with a box and on the side of the box most distant from the pushing actuator such that said box is moved in a second direction perpendicular to said first direction, and ejected.

2. The ejecting system according to claim 1, wherein the rotating member is a wheel.

3. The ejecting system according to claim 1, wherein the rotating member is a wheel having a structure on its periphery, wherein at least one side of each of the boxes has a corresponding structure such that the structures on the wheel and the boxes mesh with one another.

4. The ejecting system according to claim 1, wherein the rotating member has a gear wheel structure and wherein at least one side of each of the boxes comprises a rack structure for meshing with the gear wheel structure.

5. The ejecting system according to claim 1, wherein the driving actuator is an electric motor.

6. The ejecting system according to claim 1, wherein the pushing actuator is a spring.

7. The ejecting system according to claim 1, the pushing actuator is pneumatically driven.

8. The ejecting system according to claim 1, wherein the pushing actuator is electromechanically driven.

9. The ejecting system according to claim 3, wherein the boxes comprise chaff.

10. The ejecting system according to claim 3, wherein the boxes comprise flare.

11. A vehicle comprising an ejecting system according to claim 1.

12. A vehicle according to claim 11, wherein the vehicle is an aircraft.

\* \* \* \* \*